UNITED STATES PATENT OFFICE.

JULIUS BECKER, OF CHICAGO, ILLINOIS.

COMPOSITION OF MATTER.

1,256,864.  Specification of Letters Patent.  Patented Feb. 19, 1918.

No Drawing.  Application filed November 27, 1916.  Serial No. 133,723.

*To all whom it may concern:*

Be it known that I, JULIUS BECKER, a citizen of the Swiss Confederation, residing at Chicago, Cook county, Illinois, have invented a certain new and useful Composition of Matter, of which the following is a specification.

The present invention has to do with an improved composition of matter which is very well adapted for use as a separation material for plates in electric secondary cells and the like. It will presently appear, however, that the usefulness of the material is not limited to this class of work, but that on the contrary the material may be used in some cases for other similar classes of work. Inasmuch, however, as the material or composition of matter herein disclosed is of peculiar usefulness as a separating medium for plates in electric secondary cells, I shall describe it as applied to this class of work.

In the construction of electric secondary cells, the separators used should possess the characteristics or qualities of being non-conducting and absorbent. The separator material must be electrically non-conductant; it should be absorbent, so that it will hold the sulfuric acid or electrolyte in close and uniform contact with the electrodes, and so as to permit a free movement of the electrolyte to and from the faces of the electrodes. The quality of being absorbent is particularly desirable in the case of separating material for use in the construction of small cells, such as automobile starter batteries, etc., because in such cases the clearance between the electrodes is so small that the electrolyte cannot circulate freely and the movement of the electrolyte must necessarily be largely by capillary attraction. Furthermore, the quality of being absorbent will assist in considerable degree in keeping the entire surfaces of the electrodes moist and will insure a more or less even and uniform distribution of the electrolyte throughout all portions of the cell at all times. By keeping all portions of the electrode faces moist at all times they will be worked up to the maximum capacity, and the deterioration will be reduced to a minimum.

Bearing the foregoing facts in mind, I shall now describe my improved composition of matter, and one process for manufacturing the same.

One form of the separating medium of material of the present invention consists of a fibrous base material of non-conducting quality and acid proof composition, in conjunction with a pasty or semi-pasty filling material which, while resisting chemical action or decomposition by the electrolyte, will nevertheless serve as an excellent medium for absorbing the electrolyte and holding the same at all times against all portions of the electrodes. A fabric of felted asbestos or glass wool will serve as an excellent fibrous base material, but I wish to emphasize the fact that any absorbent, non-conductive, acid-proof material may be used for the base material.

To this base material, or with it, I mix a suitable pasty material of such composition that the electrolyte will be readily absorbed and retained thereby without decomposition or deterioration. A satisfactory material for this paste, and one which gives excellent results in service comprises a mixture of volcanic ash and calcium sulfate ($CaSO_4$). These, in proper proportions, and rendered pasty by the use of sulfuric acid, may be mixed with the asbestos, or glass wool, and the entire mixture may then be formed or molded into separators of desired shape or form.

As an example of one application of the invention herein disclosed, I shall mention the following, although I wish it distinctly understood that in so doing I do not limit myself to the proportions of ingredients named, nor to the steps of the process, except as I may limit myself in the claims.

I will mention the use of asbestos fibers as the base material. These should first be cleaned by the use of hydrochloric or muriatic acid (HCl) so as to remove any traces of free metal such as iron and the like. The paste may conveniently be made up from volcanic ash and calcium sulfate, together with sulfuric acid. When these ingredients are chosen, they may be mixed in about the following proportions: From 50 to 60 pounds of dry powdered volcanic ash is thoroughly mixed with from 40 to 50 pounds of dry powdered calcium sulfate ($CaSO_4$). Thereupon this mixture may be mixed with about 50 pounds of sulfuric acid ($H_2SO_4$) of between 30 and 38 degrees Bé. This acid is more concentrated than that used as the electrolyte, so that the electrolyte will not be diluted thereby. The acid will render the mass pasty and of suitable consistency for application. The asbestos fibers to the extent of about one pound should then be thoroughly mixed into the pasty mass so as to complete the mixture.

This pasty mixture can then be molded into suitable form for the separators. Such molding may be accomplished, for example, between sheets of blotting paper or the like, which will take up any superfluous acid.

The composition of separator set forth above is found to give excellent service. The calcium sulfate when used serves to keep the separator in a pasty condition, so that it will at all times perform its functions in a most excellent and satisfactory manner. Although the calcium sulfate in the presence of free water will undergo a chemical change and become hard and brittle, still when moistened with sulfuric acid it will not take the water from the acid, but, on the contrary, will remain in a pasty condition. The ash of the mixture serves to give it an added acid absorptive power, so that the mixture is thereby given an added capacity to take up the electrolyte and hold the same against the electrodes. Thus the combination of the ash and calcium sulfate gives a mixture of high absorptive power and one which will at all times retain its pasty condition, while the fiber of the mixture serves to bind it together and give it added mechanical strength.

While I have in the preceding description mentioned the use of a "base material" such as asbestos or glass wool, still I wish to distinctly point out the fact that the use of such a base material or for that matter, the use of any "base material," is unessential, and that in many cases the base material may be dispensed with, use being made only of a pasty material. Consequently I call attention to the fact that I am not limited to the use of a base material except as I may limit myself in the claims.

I also wish to call attention to the fact that the separator material herein disclosed is very well adapted for use in what I shall term "dry-secondary-cells," because of its high electrolyte absorptive power which will hold the electrolyte against all portions of the electrodes. In the construction of "dry-secondary-cells" it is frequently difficult to provide properly for any gassing which will occur. The layer or closure of asphaltum or the like on the top of the cell will, if it directly contacts the upper edges of the plates, interfere with a proper delivery of the gas to the vent opening. I have discovered the fact that if a layer of granulated manganese dioxid ($MnO_2$) be interposed between the upper edges of the plates and the asphaltum closure, the gas rising from all portions of the cell will find its way to the vent through the pores or openings of said layer. Furthermore, the hydrogen of the gas will combine with the oxygen of the manganese dioxid to form water and deoxidize the manganese.

While I have in the above example mentioned a particular composition of material, and one which is put together by a particular process of steps, still I do not limit myself to either the composition or the steps except as I may do so in the claims.

I claim:

1. As a new article of manufacture, a battery separator for plates in electric secondary cells, comprising a mixture of powdered volcanic ash, powdered sulfate, and sulfuric acid substantially in the respective proportions of 50, 40 and 50 by weight, in conjunction with a base of asbestos fiber substantially in the proportion of 1 by weight, the acid being of substantially 32°–38° Bé. in strength.

2. As a new article of manufacture, a battery separator for plates in electric secondary cells, comprising a mixture of powdered volcanic ash, powdered calcium sulfate, and sulfuric acid in substantially equal amounts by weight, in conjunction with asbestos fiber in amount by weight equal to substantially one fiftieth part of each of the other constituents.

3. As a new article of manufacture, a battery separator for plates in electric secondary cells, comprising a mixture of powdered volcanic ash, powdered calcium sulfate, and sulfuric acid in substantially equal amounts by weight, in conjunction with a suitable amount of fibrous binding or base material for the purpose of binding the mixture together.

4. As a new article of manufacture, a battery separator for plates in electric secondary cells, comprising a mixture of powdered volcanic ash, powdered calcium sulfate, and sulfuric acid in suitable proportions to provide a pasty mass of desired consistency, in conjunction with a fibrous base material.

5. As a new article of manufacture, a battery separator for plates in electric secondary cells, comprising a pasty mixture of volcanic ash, calcium sulfate, sulfuric acid, and fibrous base material, suitably proportioned to give a pasty mixture of desired consistency.

6. As a new article of manufacture, a battery separator for plates in electric secondary cells, comprising a pasty mixture of calcium sulfate, sulfuric acid, and fibrous base material, suitably proportioned to give a pastry mixture of desired consistency.

7. As a new article of manufacture, a separator for plates in electric secondary cells, consisting of a porous absorptive nonconducting mass consisting essentially of calcium sulfate, volcanic ash, and a fibrous binder.

8. As a new article of manufacture, a battery separator for plates in electric secondary cells comprising a pastry mixture of calcium sulfate and sulfuric acid.

9. As a new article of manufacture, a battery separator for plates in electric secondary cells comprising a pasty mixture of volcanic ash, calcium sulfate and sulfuric acid.

10. As a new article of manufacture, a battery separator for plates in electric secondary cells comprising a mixture of volcanic ash, calcium sulfate and sulfuric acid.

11. As a new article of manufacture, a porous adsorptive non-conducting mass consisting essentially of volcanic ash, calcium sulfate, and sulfuric acid.

12. As a new article of manufacture, a porous absorptive non-conducting mass consisting essentially of volcanic ash, calcium sulfate, and a suitable fluid to render the same pasty.

JULIUS BECKER.

Witnesses:
THOMAS A. BANNING, Jr.,
FRANCES M. FROST.